Patented Oct. 12, 1954

2,691,672

UNITED STATES PATENT OFFICE 2,691,672

PROPYLENE GLYCOL BIS(CHLOROACETATE)

Harry F. Brust, Midland, Mich., assignor to The Dow Chemical Company, Midland, Mich., a corporation of Delaware No Drawing. Application May 1, 1952, Serial No. 285,532

1 Claim. (Cl. 260—487)

This invention is concerned with propylene glycol bis(chloroacetate) having the formula

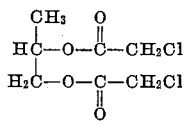

The new ester compound is an oily liquid somewhat soluble in many organic solvents and substantially insoluble in water. It is of value as a solvent for other organic chemicals, as an additament in plastic compositions, and as an active ingredient in contact herbicidal compositions.

The new compound may be prepared by reacting one molecular proportion of propylene glycol with at least two molecular proportions of monochloroacetic acid. In practice, it is generally preferred to employ a suitable esterification catalyst such as concentrated phosphoric acid, concentrated sulfuric acid, toluene sulfonic acid or the like. The reactants are mixed together, in the presence of the catalyst if used, and heated for a period of time, water of reaction being removed as formed to complete the reaction. The reaction proceeds smoothly at temperatures of from 50° to 150° C., however, in commercial practice, heating to a temperature of 80° to 125° C. is preferred. Upon completion of the reaction, the ester compound may be separated by conventional methods such as decantation, extraction and fractional distillation.

In a preferred method of operation, the propylene glycol, monochloroacetic acid and catalyst are mixed together in a suitable organic solvent such as toluene or ethylene dichloride. The resulting mixture is heated for a period of time at a temperature of at least 80° C. In general, it is convenient to carry out the reaction at the boiling point of the reaction mixture. During the reaction, the solvent together with water of reaction is distilled off, recovered and separated, the solvent being recycled.

In a representative operation, 586 grams (6.2 moles) of monochloroacetic acid and 228 grams (3.0 moles) of propylene glycol were dissolved together in 300 milliliters of ethylene dichloride and 1.5 milliliters of concentrated sulfuric acid was added. This mixture was heated to a temperature of about 115° C. for a period of 16 hours. Ethylene dichloride, together with water of reaction, distilled out of the reaction zone and was condensed and separated, the ethylene dichloride being returned to the reaction vessel. On completion of the above reaction period, the reaction mixture was cooled and washed twice with 200 milliliter portions of ice water. The washed product was fractionally distilled under reduced pressure to obtain propylene glycol bis(chloroacetate) product as an oily liquid. The latter had a boiling point of 148° to 150° C. at 10 millimeters' pressure, a specific gravity of 1.3298 at 25° C., a refractive index ($n$/D) of 1.4620 at 25° C. and a saponification equivalent by titration of 115 as compared to a theoretical saponification equivalent of 115.

A method and composition for the control of plant growth embodying the compound of the present invention is disclosed and claimed in an application of Keith C. Barrons, Serial No. 285,534, filed concurrently herewith.

I claim:

Propylene glycol bis(chloroacetate).

References Cited in the file of this patent

UNITED STATES PATENTS

| Number | Name | Date |
|---|---|---|
| 2,397,630 | Strain | Apr. 2, 1946 |
| 2,406,385 | Kistler | Aug. 27, 1946 |

OTHER REFERENCES

J. Chemical Society, 1948, pp. 1773–9.